United States Patent [19]

Albizzati

[11] Patent Number: 4,472,524

[45] Date of Patent: Sep. 18, 1984

[54] COMPONENTS AND CATALYSTS FOR THE POLYMERIZATION OF OLEFINS

[75] Inventor: Enrico Albizzati, Arona, Italy

[73] Assignee: Montedison S.p.A., Milan, Italya

[21] Appl. No.: 465,593

[22] Filed: Feb. 10, 1983

[30] Foreign Application Priority Data

Feb. 12, 1982 [IT] Italy ............................... 19622 A/82

[51] Int. Cl.$^3$ ............................................. C08F 4/64
[52] U.S. Cl. .................................... 502/113; 502/118; 502/119; 502/123; 502/124; 502/125; 502/129; 502/132; 526/114; 526/125
[58] Field of Search ............... 502/113, 118, 119, 124, 502/125, 123, 132, 129

[56] References Cited

U.S. PATENT DOCUMENTS

| | | | |
|---|---|---|---|
| 4,107,415 | 8/1978 | Giannini et al. | 502/129 X |
| 4,174,299 | 11/1979 | Giannini et al. | 502/123 X |
| 4,226,741 | 10/1980 | Luciani et al. | 502/125 X |
| 4,294,721 | 10/1981 | Cecchin et al. | 502/127 X |
| 4,315,836 | 2/1982 | Albizatti et al. | 502/124 X |
| 4,331,561 | 5/1982 | Luciani et al. | 502/125 |

*Primary Examiner*—Patrick Garvin

[57] ABSTRACT

Catalysts for the polymerization of alpha-olefins, comprising the product of the reaction between:
(a) a metalorganic Al compound;
(b) an electron-donor compound reactive towards $MgCl_2$ but which results not to be completely complexed with Al-triethyl at the equivalent point of the potentiometric titration under standard conditions;
(c) a solid comprising a halogenated Ti compound supported on an anhydrous Mg halide and at least one of the following activators:
  (1) an Al, Fe, Mn, Sb or Zn compound containing at least one metal-halogen bond;
  (2) a complex between an electron-donor compound and a Lewis acid chosen among the halides of the metals of Groups II–VIII of the Periodic System other than Ti;
  (3) a compound or composition, inert towards the Mg halide, having a dielectric constant at 20° C. higher than 2;

compounds (1), (2) and (3) being extractable from the solid for at least 30% by mols by treatment with toluene at 80° C. for 2 hours, and the surface area of the solid after extraction being higher than 20 $m^2/g$.

13 Claims, No Drawings

COMPONENTS AND CATALYSTS FOR THE POLYMERIZATION OF OLEFINS

The present invention refers to new supported catalysts for the polymerization of olefins $CH_2=CHR$, wherein R is an alkyl with 1–4 carbon atoms or an aryl, and mixtures of said olefins with each other and/or with ethylene.

BACKGROUND OF THE INVENTION

Earlier patent applications originating with our research group have disclosed catalysts endowed with high activity and high stereospecificity, obtained from metalorganic Al compounds, silicon compounds containing Si-OC, Si-OCOR or Si-NR$_2$ bonds and a solid comprising a halogenated Ti compound and an electron-donor compound, both supported on an active Mg halide, the electron-donor compound being selected from specific classes of esters.

I have now found, unexpectedly, that it is possible to obtain highly active and stereospecific catalysts by employing, in the preparation of the catalysts disclosed in the previous patent applications, supported solid components comprising new classes of activators as indicated hereinafter.

The catalysts of the invention comprise the product of the reaction between at least the following components:

(a) an Al-alkyl compound, preferably an Al-trialkyl or a compound containing two or more Al atoms linked to each other through oxygen or nitrogen atoms or through SO$_4$ or SO$_3$ groups;

(b) an electron-donor compound (or Lewis base) which, under the standard conditions of measurement as specified hereinafter, reacts with MgCl$_2$ but results not to be completely complexed with Al-triethyl at the equivalent point of a potentiometric titration;

(c) a solid comprising a Ti compound containing at least a Ti-halogen bond, supported on an anhydrous Mg halide and at least one of the following activators in an amount not lower than 5% by mols with respect to the Mg halide;

(1) an Al, Fe, Mn, Sb or Zn compound containing at least one metal-halogen bond;

(2) a complex between an electron-donor compound and a Lewis acid chosen among the halides of the metals of Groups II–VIII of the Periodic System other than Ti;

(3) a compound or composition inert towards the Mg halide and having a dielectric constant at 20° C. higher than 2;

compounds (1), (2) and (3) being extractable from the solid for at least 30% by mols by treatment with toluene at 80° C. for 2 hours, and the surface area of the solid after extraction being higher than 20 m$^2$/g.

Representative examples of the compounds indicated under (c)-(1) are: Al-dichloro-phenoxy, Al-monochloro-diphenoxy, Al-dichloro-xylenoxy, Al-monochloro-dixylenoxy, Al-dichloro-2,6-t-butyl-p-cresoxy, Al-dichloro-octoxy, Al-monoethyl-dichloride, Al-siloxyl-chloride, Zn-chloro-phenoxy, Zn-chloro-xylenoxy, Fe-dichloro-phenoxy, Mn-chloro-phenoxy.

The complexes indicated under (c)-(2) are selected particularly from: complexes of AlCl$_3$ and SbCl$_3$ with esters of aromatic monocarboxylic acids or with alkyl aryl ethers or diaryl ethers; complexes of SnCl$_4$ with esters of aromatic monocarboxylic acids; complexes of ZnCl$_2$ or FeCl$_3$ with ethers or esters of monocarboxylic acids.

Representative compounds are the 1:1 complexes AlCl$_3$/ethyl benzoate, AlCl$_3$/anisole or phenetole, SnCl$_4$/ethyl benzoate, ZnCl$_2$/anisole, BF$_3$/diethyl ether.

The activators indicated under (c)-(3) include the compounds forming $\pi$-bonds, such as, for instance, mesitylene, durene, hexamethylbenzene, anthracene, naphthalene, biphenyl, tetraphenylmethane, carbazole, phenanthrene, fluorene.

Other (c)-(3) compounds which can be employed are the halogenated hydrocarbons, such as, for instance, 1,2-dichloroethane, o-dichlorobenzene, hexachloroethane, n-butyl chloride, benzyl chloride, chloronaphthalenes, chloroform; the chlorosilanes, such as Si(C$_6$H$_5$)$_2$Cl$_2$, SiCl$_3$CH$_3$, Si(CH$_3$)$_3$Cl, Si(C$_2$H$_5$)$_3$Cl, (SiCH$_3$Cl$_2$)$_2$O; the polysiloxanes, such as polymethylsiloxane, hexamethyldisiloxane, octamethylcyclotetrasiloxane.

Other usable (c)-(3) compounds include anisole, chloroanisole, 2,4-dichloroanisole, bromophenetole.

As indicated, the activators are present in the catalyst component in an amount of at least 5% by mols with respect to the Mg halide.

Compounds (c)-(1) and (c)-(2) can be present at most in an amount equimolecular with respect to the Mg halide, while compounds (c)-(3) can be employed also in higher amounts consistently with the operative requirements of the preparation. Preferably, the activators are employed in molar ratios with respect to the Mg halide comprised between 0.1 and 0.3.

Preferably, in the preparation of the catalyst component (c), an electron-donor compound capable of forming complexes with MgCl$_2$ and with Al-triethyl is also employed.

The preferred electron-donor compounds are selected from the alkyl and aryl esters of aromatic carboxylic acids, such as for example benzoic, toluic, p-methoxybenzoic and phthalic acid.

Representative esters are: ethyl benzoate, ethyl p-toluate, n-octyl phthalate, diisobutyl phthalate.

Other usable esters are the alkyl and aryl pivalates, maleates, malonates and acrylates.

The activators are added to the catalyst component during the preparation of the same; in some cases, such as for example that of the electron-donor/Lewis acid complexes and of some compounds containing metal-halogen bonds, they can be formed "in situ".

For example, by employing in the preparation of component (c) AlCl$_3$ and ethyl benzoate and/or anisole, complexes of AlCl$_3$ with said compounds are formed. Likewise, compounds containing Al-Cl bonds are formed by using Al-triphenoxy as a precursor of the compound (c)-(1) while operating in the presence of halogenating agents.

By Ti compounds supported on a Mg dihalide are meant the compounds not extractable from component (c) after treatment with toluene for 2 hours.

The treatment with toluene at 80° C. for 2 hours is carried out on dispersions containing 5% by weight of solid. After said treatment at least 30% and preferably 40–70% by mols of the compounds employed as activators are extracted.

The surface area after extraction is higher than 20 m$^2$/g and preferably is comprised between 80 and 300 m$^2$/g.

Interesting results have been obtained with components (c) comprising, as activator, a π-bonds forming compound containing one or more polyalkyl substituted aromatic rings, such as for instance durene and hexamethylbenzene, and an electron-donor compound complying with the criterion of being extractable from component (c) for at least 70% by mols by treatment with Al-triethyl in the standard conditions specified hereinafter.

Representative classes of these compounds are the esters of ortho-dicarboxylic acids, the esters of monocarboxlylic acids containing at least one branched group linked to the carboxyl group, the esters of carbonic acid, the esters of unsaturated dicarboxylic acids.

The standard conditions of the reaction with $AlEt_3$ are: into a flask of 5 liters holding capacity are introduced 4 liters of anhydrous and deaerated n-heptane containing 20 mMoles $Al(C_2H_5)_3$. The temperature is raised to 70° C., about 1 g of solid catalyst component is introduced and the whole is allowed to react under stirring for 15 minutes. It is cooled rapidly to 0° C. and filtered, thus isolating a solid which is dried under vacuum at 25° C. and analyzed.

In the catalyst components (c) comprising an electron-donor compound, the latter is employed in an amount corresponding to a molar ratio with respect to the Mg dihalide comprised between 0.05 and 0.5.

Preferably, the activator is selected from the Al compounds containing at least one Al-halogen bond, the complexes of $AlCl_3$ or $SbCl_3$ with esters of aromatic monocarboxylic acids, as for example ethyl benzoate, or with ethers, as for example diisoamyl ether, anisole, phenetole, and the compounds forming π-bonds, such as hexamethylbenzene and durene.

As indicated, the complexes and the compounds containing metal-halogen bonds can be formed "in situ". Valuable results have been obtained by employing mixtures of the compounds (c)-(1) and (c)-(2), preformed or formed "in situ", and optionally (c)-(3), to which an electron-donor compound has also been added. The activator (c)-(3) is preferably employed in admixture with an electron-donor compound.

Components (a), (b) and (c) are caused to react with each other in any order; nevertheless, preferably components (a) and (b) are premixed before being contacted with component (c).

Component (c) can be premixed with component (a) and/or with component (b). Premixing of (a) and (b) is performed at temperatures usually comprised between room temperature and the polymerization temperature.

The pre-reaction of (c) and (b) can be carried out also at higher temperatures. Compound (b) can also be incorporated in and made to react with component (c) itself.

Component (b) is reacted in a molar ratio with respect to the halogenated Ti compound supported on component (c) of at least 1, and in a molar ratio with respect to the Al-alkyl compound employed as component (a) lower than 20 and preferably comprised between 0.05 and 1. Ratios higher than 1 can be employed in the case of compounds (b) not complexing or complexing only weakly with Al-triethyl also in conditions promoting the formation of the complex.

In component (c), the molar ratio between the Mg dihalide and the halogenated Ti compound supported on it is comprised between 1 and 500, and the molar ratio between the halogenated Ti compound and the electron-donor, both supported on the Mg dihalide, is comprised between 0.1 and 50.

The electron-donor compound as defined in (b) does not show at the equivalent point of the titration test with Al-triethyl (carried out under the standard conditions indicated hereinafter) any logarithmic variation of potential, i.e., a wave, in the titration curve.

A completely different situation occurs in the case of amines like isoquinoline or esters like ethyl-p-toluate or ethylbenzoate, wherein the titration curve shows a wave at the equivalent point. The absence of a wave at the equivalent point indicates that electron-donor compound (b) is present, at least in part, in non-complexed form with Al-triethyl.

Electron-donor compounds containing active hydrogen atoms reactive towards Al-triethyl, i.e., capable of substitution reactions with Al-triethyl, are prereacted with Al-triethyl, before subjecting the same to the complexation test. In the titration test the equivalent point is generally referred to the use of 1 mol of Al-triethyl per mol of donor.

Compounds (b) can be used in mixture, in a wide range, with donors forming complexes with Al-triethyl when titrated according to the test set forth above.

The titration of the mixtures containing significant amounts of the complexing donors, shows the potential variation due to the presence of said complexing donors.

However, the polymerization performance of the catalysts obtained by using the above mixtures as component (b) is not significantly reduced by the presence of the complexing donor.

The compound (b) is chosen in particular from the compounds of general formula

wherein:
R is an alkyl, alkenyl, aryl, arylalkyl or cycloalkyl with 1-20 carbon atoms;
Y is a radical —OR', —OCOR' or —NR'$_2$ wherein R', equal to or different from R, has the same meaning as R;
X is a halogen or hydrogen atom or a —OCOR" or —NR"$_2$ group wherein R", equal to or different from R', has the same meaning as R';
m, n, p are numbers ranging:
m from 0 to 3, n from 1 to 4 and p from 0 to 1;
m+n+p is equal to 4.
Preferred silicon compounds are: phenyl alkoxy silanes, such as phenyl triethoxy or phenyl trimethoxy silane, diphenyl dimethoxy and diphenyl diethoxy silane, monochloro-phenyl diethoxy silane.

In the catalysts of the invention the silicon compound is present, in combined form in the solid product of the reaction between the various components which form the catalyst, in a molar ratio silicon compound/halogenated Ti compound higher than 0.05 and in general comprised between 0.1 and 5.

Other suitable compounds (b) are: 2,2,6,6-tetramethyl-piperidine, 2,2,5,5-tetramethylpyrrolidine, 2,2,6,6-tetramethyl-piperidide-Al-diethyl, di(m-methylphenyl)amine, succinimide, 2,2,6,6-tetramethyl-tetrahydro-4-pyrone, Al-dichloro-monophenoxy.

Examples of Al-alkyl compounds constituting the component (a) are the Al-trialkyls, such as for instance $AlEt_3$, $AlEt_2H$, Al-triisobutyl, Al-triisopropyl, and compounds containing two or more Al atoms linked to each other through hetero-atoms, as

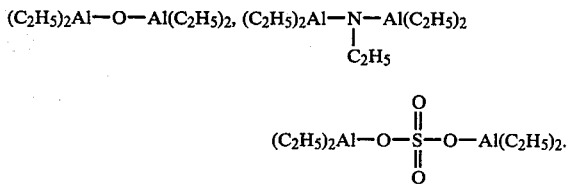

As indicated, Al-alkyl compounds in which Al atoms are linked to each other through $SO_4$ or $SO_3$ groups are also suitable.

The Al-alkyl compounds can be employed in admixture with alkyl-Al halides, as $AlEt_2Cl$. Component (c) is prepared according to several methods. One of these consists in co-grinding the Mg halide, the activator, the Ti compound and, optionally, the electron-donor compound until the product, after extraction with toluene at 80° C. for 2 hours, shows a surface area higher than 20 $m^2/g$. In this co-grinding the order of addition of the various compounds is not important.

Preparations of this type are described in U.S. Pat. No. 4,107,413.

According to another method, the anhydrous Mg halide in active form, as hereinafter defined, is hot-treated (40°–80° C.) with a solution of the activator in an aromatic or halogenated hydrocarbon solvent and subsequently with a hydrocarbon solution of the Ti compound. The resulting suspension is employed as catalyst component.

When operating according to this method, it is preverable to use an activator chosen among the complexes Lewis acid/Lewis base.

Another method consists in co-grinding the Mg halide and the activator or a precursor of the latter, for instance a Lewis acid such as $AlCl_3$, per se not extractable with toluene under the specified standard conditions, until activation of the Mg halide, in treating the ground product with a solution, in an aromatic or halogenated hydrocarbon, of an electron-donor compound capable of forming complexes with the Lewis acid, and in adding the Ti compound dissolved in a hydrocarbon.

The resulting suspension is employed as catalyst component.

In general, the concentration of the solids in the suspensions is comprised between 10 and 50% by weight based on the solvent.

Suitably, the catalyst component is pre-treated, before the reaction with the Al-alkyl compound, with an aromatic or halogenated hydrocarbon solvent, such as toluene or 1,2-dichloroethane, at a temperature comprised between room temperature and the boiling point of the solvent for a time sufficient for at least partially solubilizing the activator.

The suspension, in which the solids concentration is in general comprised between 1 and 50% by weight, is then employed as such as catalyst component.

In all the above methods, the final product contains a Mg dihalide present in the active form as defined hereinafter. For "active form of the Mg dihalide" is meant the Mg dihalides showing in the X-rays powder spectrum of component (c) a broadening of at least 30% of the most intense diffraction line which appears in the powder spectrum of the corresponding dihalide having a surface area of 1 $m^2/g$, or is meant the Mg dihalides showing an X-rays spectrum in which said most intense diffraction line is replaced by a halo with its intensity peak shifted with respect to the interplanar distance of the most intense line.

Very active forms of Mg dihalides are those showing an X-ray powder spectrum in which the most intense diffraction line appearing in the spectrum of the corresponding halide having a surface area of 1 $m^2/g$ has a decreased intensity and is broadened to form a halo, or are those in which said most intense line is replaced by a halo having its intensity peak shifted with respect to the interplanar distance of the most intense line. In general, the surface area of the above mentioned forms is higher than 20–40 $m^2/g$ and in particular is comprised between 100 and 300 $m^2/g$. The surface area is determined on component (c) after extraction with toluene at 80° C. for 2 hours. The value thus obtained is considered as the surface area of the Mg halide.

Preferred Mg dihalides are $MgCl_2$ and $MgBr_2$. The water content of the dihalides in general is lower than 1% by weight.

Other known methods for the preparation of a Mg dihalide in active form or of catalyst components containing Ti and supported on a Mg dihalide, in which the dihalide is present in the active form, are based on the following reactions:

reaction of a Grignard or a $MgR_2$ compound (R is hydrocarbyl) or of complexes $MgR_2$/Al-trialkyl with halogenating agents, as $AlX_3$ or compounds $AlR_mX_n$ (X is halogen, R is hydrocarbyl, $m+n=3$), $SiCl_4$ or $HSiCl_3$;

reaction of a Grignard compound with a silanol or a polysiloxane, $H_2O$ or with an alcohol and subsequent reaction with a halogenating agent or with $TiCl_4$;

reaction of Mg with an alcohol and with a hydrogen halide, or of Mg with a hydrocarbyl halide and with an alcohol;

reaction of MgO with $Cl_2$ or $AlCl_3$;

reaction of $MgX_2 \cdot nH_2O$ (X=halogen) with a halogenating agent or with $TiCl_4$;

reaction of Mg mono- or dialcoholates or of Mg carboxylates with a halogenating agent.

The Ti compounds containing at least one Ti-halogen bond include in particular the Ti tetrahalides, the Ti trihalides and dihalides and the Ti trihalogen-alcoholates.

Preferred compounds are: $TiCl_4$, $TiBr_4$, 2-6,dimethylphenoxy-trichloro-titanium and trichloro-phenoxy-titanium. In the case of the Ti halogen-alcoholates, these compounds can be formed "in situ" by suitable exchange reactions between the various compounds employed in the preparation of the catalyst component. In the preferred catalysts, the component (c) is obtained from $MgCl_2$, $TiCl_4$ or $Cl_3TiOC_6H_5$ and complexes, even formed "in situ", between $AlCl_3$ and ethyl benzoate and/or ethers, such as anisole or phenetole, and component (b) is phenyl or ethyl triethoxy silane or diphenyl dimethoxy silane or diphenyl diethoxy silane.

Component (a) is an Al-trialkyl, as Al-triethyl or Al-triisobutyl.

The catalysts according to the invention are employed for polymerizing the alpha-olefins according to known procedures, that is by carrying out the polymerization in liquid phase, either in the presence or in the absence of an inert hydrocarbon solvent, or in gaseous phase or also by combining, for instance, a polymerization step in liquid phase with a step in gaseous phase.

In general, the temperature is comprised between 40° and 160° C., but preferably between 60° and 90° C., while operating either at atmospheric pressure or at a higher pressure.

As a molecular weight regulator hydrogen or another regulator of known type can be employed.

The catalysts are particularly suitable for the polymerization of propylene, butene-1, styrene and 4-methyl-pentene-1. The catalysts can also be employed for polymerizing according to known methods, mixtures of propylene and ethylene to produce modified polypropylenes having improved impact resistance at low temperatures (the so called block copolymers of propylene and ethylene) or to obtain crystalline random copolymers of propylene with minor amounts of ethylene.

The test for determining the capability of compound (b) of forming complexes is performed by using a potentiograph Metrohm model E 536 equipped with titration bench E 535, automatic burette E 552, magnetic stirrer E 549 and titration cell EA 880. A combined electrode EA 281 (Pt//Ag/AgCl/KCl 3M) is employed.

As a titrating agent there is employed a 0.5M hexane solution of Al-triethyl, which is added to a 0.5M benzene solution of the compound under analysis. It is operated at room temperature in a nitrogen atmosphere. The test of reactivity of the electron-donor compound with $MgCl_2$ is performed under the following conditions:

Into a 500 cc flask are introduced, in a nitrogen atmosphere, 2 g $MgCl_2$ (21 mMoles) suspended in 200 cc toluene and 3.5 mMoles of the electron-donor under analysis. It is allowed to react at 25° C. for 1 hour and the solid is filtered and washed with 200 cc toluene and subsequently with 200 cc n-heptane. The solid is isolated, dried and analyzed.

As $MgCl_2$ is employed the product obtained from $MgCl_2.2.5C_2H_5OH$ by reaction with Al-triethyl according to the following procedure: into a 3000 cc flask are introduced 2340 cc of a 0.83M hexane solution of $Al(C_2H_5)_3$; while keeping the temperature below 10° C., little by little are added 136 g $MgCl_2.2.5C_2H_5OH$. After completion of the addition, the mixture is heated at 70° C. for 4 hours; thereupon it is filtered and the solid is washed repeatedly with n-heptane and is dried under vacuum (0.2–0.5 Torr).

The surface area of the $MgCl_2$ thus obtained amounts to 618 m$^2$/g and the pores volume to 0.532 cc/g.

The following non-limiting examples are given to illustrate the invention in even more detail.

EXAMPLE 1

Into a jar of a vibrating mill having a total volume of 1 liter and containing 3 kg steel balls of 16 mm diameter were introduced, in a nitrogen atmosphere, 45.2 g anhydrous $MgCl_2$ and 9 g $AlCl_3$. After grinding for 16 hours, 6.1 cc anisole were introduced and the whole was ground for a further 3 hours; thereupon 10.1 cc ethyl benzoate were added while continuing the grinding for 3 hours; afterwards 3.42 cc $TiCl_4$ were introduced and the grinding was continued for 16 hours. After this time the mill was discharged in a nitrogen atmosphere.

10 g of the solid were added to 200 cc toluene and the suspension was heated at 80° C. for 2 hours. It was filtered, washed 3 times with n-heptane and dried under vacuum (0.2–0.5 Torr). The surface area of the dried solid was 83 m$^2$/g. The ratio by weight Mg/Al was 15, while in the solid before extraction it was 5.9.

10 g of the ground product were added to 100 cc $TiCl_4$ and the suspension was heated at 80° C. for 2 hours. $TiCl_4$ was removed at the same temperature by filtration and an equal amount of it was added again.

After reacting for 2 hours at 80° C., the solid was separated by filtration at 80° C. and washed several times with n-heptane at the same temperature until disappearance of the chloride ions in the filtrate.

The ratio by weight Mg/Ti was 6.2, while before the treatment with $TiCl_4$ it was 6.7; the surface area of the treated product was 211 m$^2$/g.

The data concerning the polymerization carried out with the use of the solid catalyst components and the properties of the resulting polymers are reported in the Table. In the same Table are also reported the polymerization conditions and the properties of the polymers obtained in the following examples.

EXAMPLE 2

Example 1 was repeated omitting the use of ethyl benzoate.

EXAMPLE 3

Example 1 was repeated employing, in place of $AlCl_3$, an equimolar amount of $SnCl_4$.

EXAMPLE 4

Example 1 was repeated employing, in place of $AlCl_3$, an equimolar amount of $SbCl_5$.

EXAMPLE 5

Example 1 was repeated employing, in place of anisole, an equimolar amount of diphenyl ether.

EXAMPLE 6

Example 1 was repeated employing, in place of anisole, an equimolar amount of diisoamyl ether.

EXAMPLE 7

Example 1 was repeated employing, in place of anisole, an equimolar amount of hexamethyldisiloxane.

EXAMPLE 8

Example 1 was repeated employing, in place of ethyl benzoate, an equimolar amount of phenyl triethoxy silane.

EXAMPLE 9

In a a jar as in Example 1, 49 g anhydrous $MgCl_2$ and 10.3 g $AlCl_3$ were introduced and the mixture was ground for 72 hours, after which time 13.8 cc ethyl benzoate were introduced and the whole was ground for a further 3 hours. Thereupon, 8.4 g $Cl_3TiOC_6H_5$ were added and grinding was continued for a further 60 hours.

EXAMPLE 10

Into a jar as in Example 1, 41 g anhydrous $MgCl_2$ and 8.2 g $AlCl_2(OC_6H_5)$ were introduced and the mixture was ground for 16 hours, after which 6.45 cc ethyl benzoate were added. After grinding for 3 hours, 3.18 cc $TiCl_4$ were introduced and grinding was continued for a further 16 hours.

EXAMPLE 11

Into a jar as in Example 1, 35.6 g anhydrous $MgCl_2$ and 15.4 g of the complex $AlCl_3$/ethyl benzoate were introduced. After grinding for 20 hours, 6.2 g $Cl_3Ti$-

OC$_6$H$_5$ were added and grinding was continued for a further 16 hours.

EXAMPLE 12

Into a jar as in Example 1, 40.1 g anhydrous MgCl$_2$ and 7 g 1,2-dichloroethane were introduced and the mixture was ground for 16 hours; after which 4.17 cc ethyl benzoate were added. After 3 hours 6.86 g Cl$_3$TiOC$_6$H$_5$ were added and grinding was continued for a further 16 hours.

EXAMPLE 13

Example 12 was repeated employing, in place of 1,2-dichloroethane, an equimolar amount of hexamethylbenzene.

EXAMPLE 14

Example 10 was repeated omitting the use of ethyl benzoate.

EXAMPLE 15

Into a jar as in Example 1, 39.66 g anhydrous MgCl$_2$ and 8.04 g hexamethylbenzene were introduced. After grinding for 16 hours, 6.5 g Cl$_3$TiOC$_6$H$_5$ were introduced and grinding was continued for a further 16 hours.

EXAMPLE 16

Example 1 was repeated employing, in place of TiCl$_4$, an equimolar amount of TiCl$_3$.ARA.

EXAMPLE 17

Example 2 was repeated employing, in place of TiCl$_4$, an equimolar amount of TiCl$_3$.ARA.

EXAMPLE 18

Example 1 was repeated employing, in place of TiCl$_4$, an equimolar amount of TiCl$_2$.

EXAMPLE 19

Into a jar as in Example 1, 30.3 g anhydrous MgCl$_2$ and 7.6 g AlCl$_3$ were introduced and the mixture was ground for 16 hours; thereupon 2.31 cc TiCl$_4$ were added and the whole was ground for 3 hours. Afterwards, 8.55 cc ethyl benzoate and 5.15 cc anisole were introduced and grinding was continued for another 19 hours.

EXAMPLE 20

Example 13 was repeated employing, in place of ethyl benzoate, an equimolar amount of diisobutyl phthalate and, in place of Cl$_3$TiOC$_6$H$_5$, an equimolar amount of TiCl$_4$.

EXAMPLE 21

4.04 g MgCl$_2$ in activated form (obtained as specified hereinafter) were treated at 80° C. for 30 minutes with 10 cc of a toluene solution containing 1.72 g of the complex AlCl$_3$/ethyl benzoate. After this time, 0.68 g Cl$_3$TiOC$_6$H$_5$ were added. The whole was allowed to react for 30 minutes at 80° C.; 0.2 cc of the cooled suspension were employed in the polymerization run. The results are reported in the Table.

As MgCl$_2$ was employed the product obtained from MgCl$_2$.2.5C$_2$H$_5$OH by reaction with Al-triethyl according to the following procedure: into a flask of 3000 cc holding capacity were introduced 2340 cc of a 0.83 M hexane solution of Al(C$_2$H$_5$)$_3$; while keeping the temperature below 10° C., little by little 136 g MgCl$_2$.2.5C$_2$H$_5$OH were added. After completion of the addition the whole was heated at 70° C. for 4 hours; thereupon it was filtered and the solid was washed for 4 hours; thereupon it was filtered and the solid was washed repeatedly with n-heptane and dried under vacuum (0.2–0.5 Torr).

Polymerization of propylene

Into a stainless steel autoclave of 3000 cc holding capacity, equipped with magnetic anchor stirrer and thermometer, heat stabilized at 60° C., into which propylene was made to flow, was introduced a suspension consisting of 1000 cc anhydrous and deaerated n-heptane, 5 millimoles Al-triethyl, the desired amount of electron-donor and about 70 mg of the solid catalyst component suspended in 3 cc toluene. Said suspension was prepared 15 minutes before charging.

Hydrogen at a pressure of 0.2 atmosphere was introduced and the whole was heated rapidly at 70° C. while feeding in propylene up to a total pressure of 7 atmospheres. Said pressure was kept constant over the whole polymerization time by feeding in the monomer continuously. After 4 hours, the polymerization was stopped and the polymer was isolated by filtration and dried. The amount of polymer dissolved in the filtrate was isolated, weighed and summed to the polymer soluble in boiling n-heptane for the calculation of the isotacticity index (I.I.).

TABLE

| | POLYMERIZATION OF PROPYLENE | | | | |
|---|---|---|---|---|---|
| Solid catalyst Component of Example No. | Electron-donor (ED) | AL/ED | Yield g PP/g catalyst component | I.I. (%) | η inh (dl/g) |
| 1 | C$_6$H$_5$Si(OC$_2$H$_5$)$_3$ | 5 | 7700 | 92 | 1.64 |
| 1 (comparison) | Methyl p-toluate | 3.3 | 4300 | 89 | 1.7 |
| 1 | 2,2,6,6-tetramethylpiperidine | 1 | 10000 | 80 | 1.1 |
| 2 | C$_6$H$_5$Si(OC$_2$H$_5$)$_3$ | 5 | 7100 | 88 | 1.9 |
| 2 (comparison) | Methyl p-toluate | 3.3 | 515 | 87.3 | 1.52 |
| 3 | C$_6$H$_5$Si(OC$_2$H$_5$)$_3$ | 5 | 4500 | 89.8 | 1.44 |
| 4 | " | 5 | 3500 | 87.7 | 1.9 |
| 5 | " | 5 | 4500 | 91.8 | 1.1 |
| 6 | " | 5 | 2750 | 91.2 | 0.96 |
| 7 | " | 5 | 4050 | 93.9 | 1.25 |
| 8 | " | 5 | 4900 | 93.8 | 1.1 |
| 9 | " | 5 | 6100 | 93.9 | 1.61 |
| 9 (comparison) | Methyl p-toluate | 3.3 | 600 | 92.8 | 1.80 |
| 9 | 2,2,6,6-tetramethylpiperidine | 1 | 9300 | 88.5 | 1.4 |
| 9 | (C$_6$H$_5$)$_2$Si(OCH$_3$)$_2$ | 5 | 7000 | 94.8 | 1.44 |

TABLE-continued
POLYMERIZATION OF PROPYLENE

| Solid catalyst Component of Example No. | Electron-donor (ED) | AL/ED | Yield g PP/g catalyst component | I.I. (%) | $\eta$ inh (dl/g) |
|---|---|---|---|---|---|
| 10 | $C_6H_5Si(OC_2H_5)_3$ | 5 | 5800 | 91 | 1.87 |
| 11 | $C_6H_5Si(OC_2H_5)_3$ | 5 | 5900 | 90.7 | 1.32 |
| 12 | " | 5 | 5600 | 87.5 | 2.0 |
| 13 | " | 5 | 4300 | 94.6 | 1.7 |
| 14 | " | 5 | 5200 | 87.1 | 1.9 |
| 15 | " | 5 | 4150 | 88 | 1.39 |
| 16 | " | 5 | 5700 | 91.8 | 1.2 |
| 17 | " | 5 | 5300 | 88.4 | 1.55 |
| 18 | " | 5 | 3200 | 96.5 | 1.3 |
| 19 | " | 5 | 6800 | 91.8 | 1.65 |
| 20 | " | 5 | 3000 | 95.1 | 1.3 |
| 21 | " | 5 | 2000 | 97.8 | 1.05 |

I claim:

1. Catalysts for the polymerization of alpha-olefins $CH_2=CHR$, wherein R is an alkyl radical with 1-4 C atoms or an aryl radical, comprising the product of the reaction between at least the following components:
   (a) an Al-alkyl compound;
   (b) an electron-donor compound (or Lewis base) which, under the standard conditions of measurement, reacts with $MgCl_2$, but results not to be completely complexed with Al-triethyl at the equivalent point of a potentiometric titration;
   (c) a solid comprising a Ti compound containing at least a Ti-halogen bond, said Ti compound being supported on an anhydrous Mg halide, and at least one of the following activators in an amount not lower than 5% by mols with respect to the Mg halide:
   (1) an Al, Fe, Mn, Sb or Zn-compound containing at least a metal-halogen bond;
   (2) a complex between an electron-donor compound and a Lewis acid selected from the halides of metals of Groups II to VIII of the Periodic System other than Ti;
   (3) a compound or composition inert towards the Mg halide, having a dielectric constant at 20° C. higher than 2;
compounds (1), (2) and (3) being extractable from the solid for at least 30% by mols by treatment with toluene at 80° C. for 2 hours, and the surface area of the solid after extraction being higher than 20 m²/g.

2. Catalysts according to claim 1, in which the activator is selected from the group consisting of Al compounds containing Al-halogen bonds, complexes of $AlCl_3$ or $SbCl_3$ with esters of aromatic monocarboxylic acids or with ethers and $\pi$-bonds forming compounds containing polyalkyl substituted aromatic rings.

3. Catalysts according to claim 1, in which the activator selected from the compounds (c)-(1) and (c)-(2) is formed "in situ".

4. Catalysts according to claim 1, in which in the preparation of component (c) an electron-donor compound is employed.

5. Catalysts according to claim 1, in which the catalyst component (c) comprises a $\pi$-bonds forming compound containing at least one polyalkyl substituted aromatic ring and an electron-donor selected from the group consisting of esters or ortho-dicarboxylic acids, esters of monocarboxylic acids containing at least one branched radical linked to the carboxyl group, esters of unsaturated dicarboxylic acids and esters of carbonic acid.

6. Catalysts according to claim 5, in which the catalyst component is prepared by co-grinding its components.

7. Catalysts according to claim 1, in which the activator dissolved in an aromatic or halogenated hydrocarbon is contacted with a pre-activated Mg halide.

8. Catalysts according to claim 1, in which compound (b) is selected from the Si compounds containing at least one Si-OR, Si-OCOR or Si-$NR_2$ bond, wherein R is an alkyl, alkenyl, aryl, arylalkyl or cycloalkyl radical with 1-20 C atoms.

9. The catalysts according to claim 1, in which the catalyst component (c) has been subjected to treatments with aromatic or halogenated hydrocarbon solvents at a temperature and for a time insuring at least partial solubilization of the activator contained in it, and the resulting suspension is employed as such as a catalyst component without previous substantial separation of the hydrocarbon solvent.

10. The catalyst components of the catalysts according to claim 5.

11. The catalyst components of the catalysts according to claim 9.

12. The catalysts according to claim 1, in which the Mg halide is $MgCl_2$.

13. The catalysts according to claim 1, in which the Mg halide is $MgBr_2$.

* * * * *